Jan. 26, 1932.  S. EINSTEIN  1,842,375
GRINDING MACHINERY
Filed Nov. 1, 1927   2 Sheets-Sheet 1
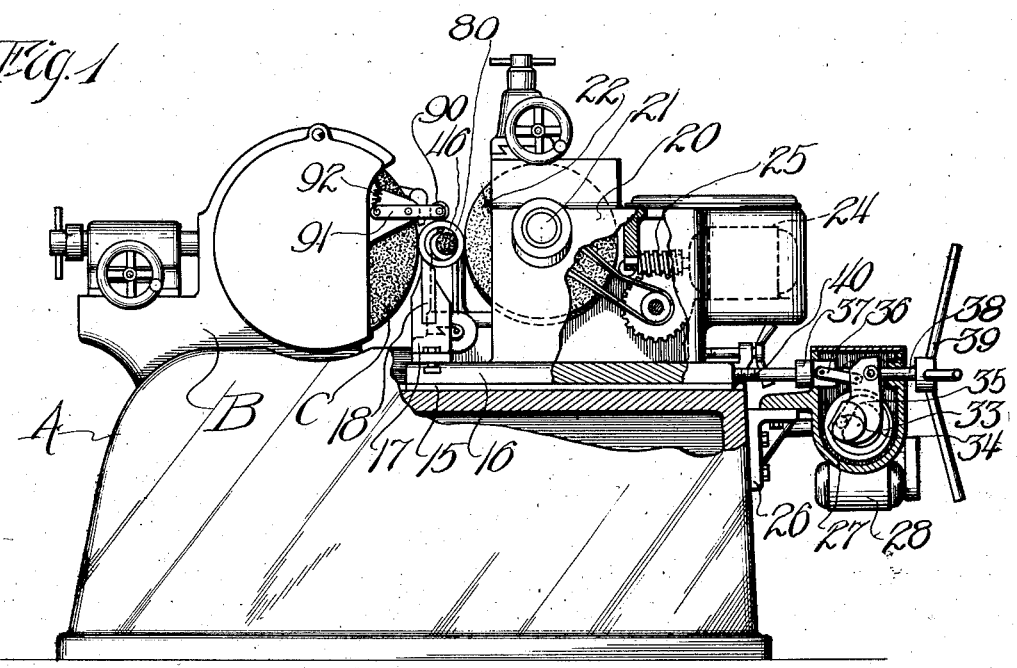
Fig. 1
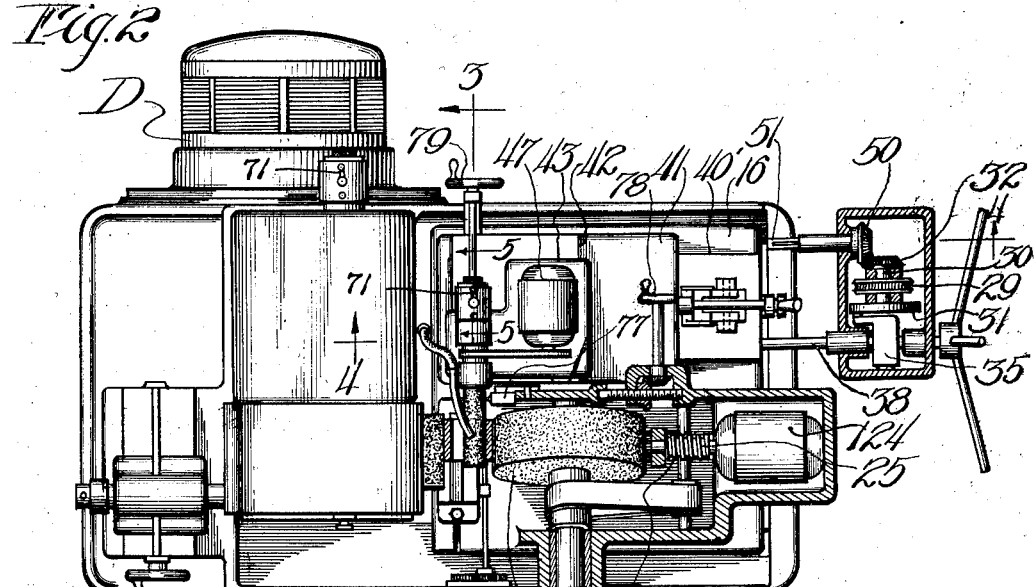
Fig. 2
Fig. 11
Inventor
Sol F. Einstein
By A. H. K. Parsons
Attorney Jan. 26, 1932.   S. EINSTEIN   1,842,375
GRINDING MACHINERY
Filed Nov. 1, 1927    2 Sheets-Sheet 2
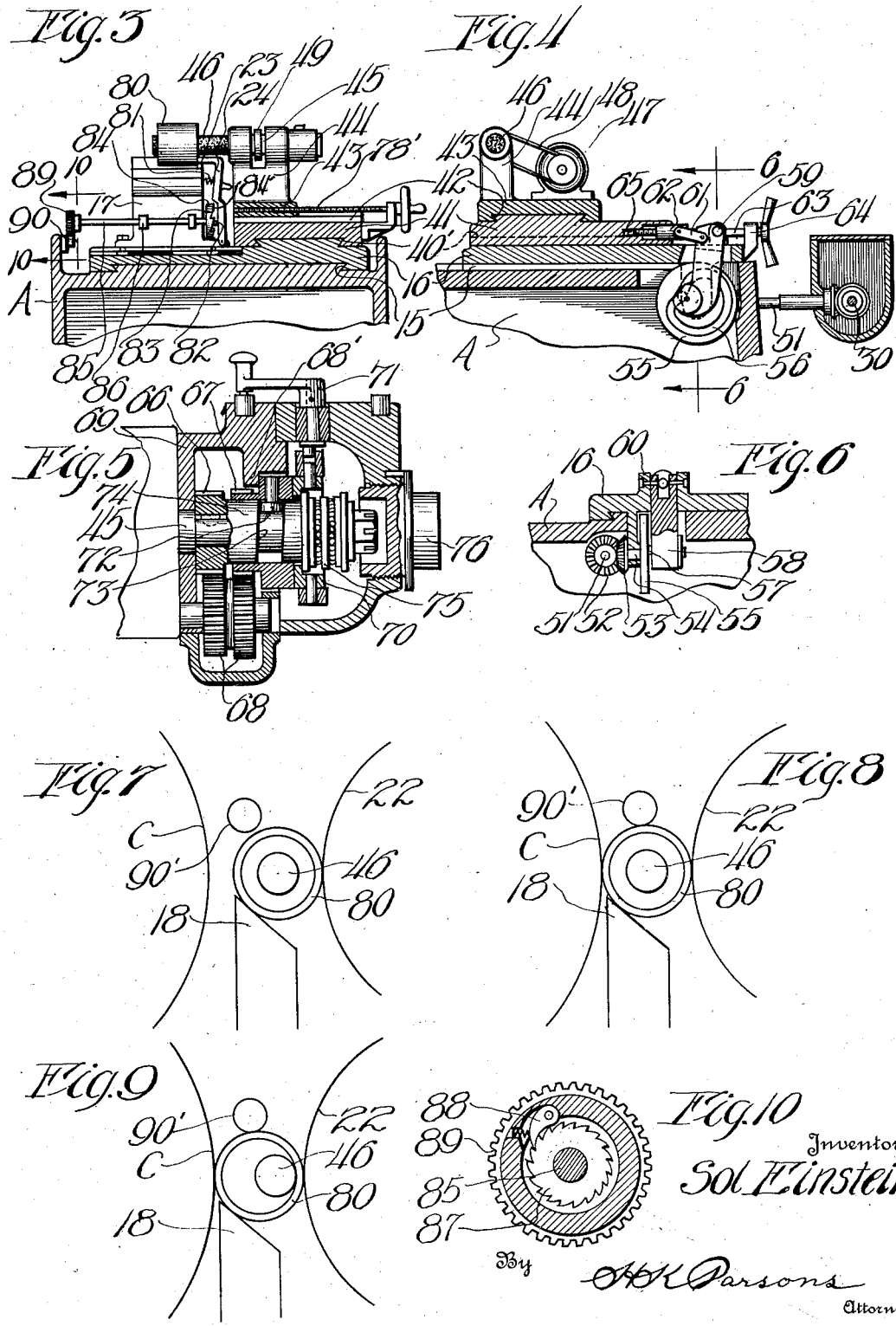

Patented Jan. 26, 1932

1,842,375

UNITED STATES PATENT OFFICE

SOL EINSTEIN, OF CINCINNATI, OHIO, ASSIGNOR TO CINCINNATI GRINDERS INCORPORATED, OF CINCINNATI, OHIO, A CORPORATION OF OHIO

GRINDING MACHINERY

Application filed November 1, 1927. Serial No. 230,335.

This invention relates to improvements in grinding and has particular reference to a novel and improved process of producing completely finished work pieces such as bushings with a single handling and further to a machine for the carrying out of said process.

The great problem in industry today is that of securing highest possible production per individual workman and the limitations on production are primarily affected by the rate at which an operator can introduce and remove the pieces from a machine inasmuch as the handling is necessarily lost time as respects the actual productivity of the machine.

In the manufacture of tubular articles as for example bushings which must have inner and outer surfaces accurate as to diameter within a fractional thousandth of an inch and also concentric with each other, it has hitherto been necessary to perform the grinding of the internal and external surfaces separately and on separate machines. This has required two handlings of the work as respects introduction and removal from the individual machines and an additional handling in transferring the work from one machine to the other.

The principal object of the present invention therefore is the elimination of these difficulties by the provision of a novel process of production of work pieces of this character.

A further object of the invention is the provision of a machine for carrying out of said process which will be capable of simultaneously or successively forming the inner and outer surfaces with proper accuracy as to size and within prescribed limits as to concentricity.

A further object of the present invention is the provision of a machine which shall function automatically to sequentially perform the several desired operations on the work piece so that entire attention of the operator may be directed to introduction of the work pieces and necessary adjustments of the machine to maintain proper size of the finished product.

Other objects and advantages of the present invention should be readily apparent by reference to the following specification taken in connection with the accompanying drawings illustrative of one embodiment thereof and it will be understood that I may make any modifications in the specific steps described or structural details illustrated within the scope of the appended claims without departing from or exceeding the spirit of the invention.

Figure 1 is a front elevation with parts shown in section of a machine embodying the principles of this invention.

Figure 2 is a plan view also with parts in section.

Figure 3 is a fragmentary sectional view as on the line 3—3 of Figure 2.

Figure 4 is a fragmentary longitudinal section through the internal grinder control mechanism as on line 4—4 of Figure 2.

Figure 5 is a section through the mechanism for limited reciprocation of the respective grinding wheel spindles as on line 5—5 of Figure 2.

Figure 6 is a fragmentary sectional view of the internal grinder slide oscillator on line 6—6 of Figure 4.

Figures 7, 8, and 9 are diagrammatic views illustrating the several steps in the improved grinding process.

Figure 10 is a section showing the construction of the ejector actuator.

Figure 11 is a fragmentary view illustrating the internal grinding wheel truing device adjustment.

The present invention relates to a process of producing bushings or similar tubular articles in a most efficient and expeditious manner. Broadly speaking, it consists in supporting the work piece on its periphery for free floating movement and operating on the exterior and internal surfaces to produce the prescribed diameters while controlling the position and rate of rotation of the work piece as respects the grinding wheels.

The process furthermore contemplates the simultaneous or successive grinding or finishing of the interior of the work while it is held in said floating position, and in the utilization of the means for determining the position and rotation of the work in the exterior grinding operation as the means for supporting the work for the internal grinding and determining the wall thickness produced by said internal grinding.

In the drawings a machine has been illustrated capable of carrying out the several steps of the process in question.

The letter "A" designates the bed of a grinder of what is commonly known as the centerless type having mounted thereon the head "B" rotatably supporting the grinding wheel "C". Power is suitably transmitted in the customary manner from the motor located at "D" to the grinding wheel "C" to cause the latter to rotate in a clockwise direction or with its surface at the inner side moving downwardly toward the bed and at a suitable grinding rate such as approximately 5000 feet per minute.

The bed is further formed with the ways 15 for the reciprocable slide 16. This slide bears at its end a bracket 17 having mounted thereon the angle top work rest blade 18 designed to peripherally engage and support a work piece 19. This slide is further provided with a frame unit 20 having journaled therein the spindle 21 for the regulating wheel 22. This spindle has been shown as disposed at an angle to the horizontal to cause the regulating wheel to exert a feed component or thrust against the work urging the work transversely of the work rest blade into engagement with the stop forming terminus 23 of the ejector 24 pivoted to the work rest bracket 17 and operated as hereinafter described.

The regulating wheel frame or unit 20 further serves as a support for the drive motor 124 which operates through suitable worm or like reduction gearing 25 to rotate the regulating wheel 22 in a clockwise direction. Consequently the inner or work engaging portion of the regulating wheel moves upwardly as respects the work rest for engagement with the opposite side of the work from that engaged by the grinding wheel "C." The regulating wheel rotated at a slow rate of speed, as for example in the neighborhood of 40 R. P. M., frictionally engages the work and controls the rate of rotation thereof.

The present machine is intended to operate in accordance with what is known as the in-feed grinding principle in which the reduction in external diameter of the work is attained by a narrowing of the distance between grinding and regulating wheels and a subsequent opening up of this throat for the removal of a finished work piece and introduction of an unfinished one. It will be understood that it is desirable to effect these movements automatically. To accomplish this, there is secured to bracket 26 on the bed "A" the housing 27 bearing the drive motor 28. This motor acts through suitable connections including worm gear 29 to rotate shaft 30 which bears on one end a control cam 31 and on the opposite end the bevel pinion 32. Cam 31 has the face groove 33 cooperating with follower pin 34 to rock lever 35. Lever 35 is connected by link 36 with slide block 37. This block has swiveled therein adjusting screw 38. This screw has on one end the operating handle 39 for rotation thereof and has its opposite end 40 in threaded engagement with slide 16. Rotation of the screw 38 adjusts the in and out position of slide 16 with respects to slide black 37, while actuation of the motor and thus of cam 33 rocks the lever and causes an automatic back and forth shifting or oscillation of the slide of a prescribed amplitude in a path whose inner limit is determined by adjustment of screw 38. This adjustment for example accommodates the machine to different diameters of work or serves to compensate for wear or reduction in diameter of the regulating wheel.

It will be understood in this grinding that the regulating wheel determines the inward movement of the work with respect to the grinding wheel and subsequently that the finished diameter of the work piece is that of the width of the throat between grinding and regulating wheels at their point of contact with the work. Since the grinding wheel will cut away whatever material is in excess of this width the regulating wheel may be properly termed the determinate of the work position and diameter.

While the general type of mechanism just described for reciprocation of the regulating wheel slide is disclosed and claimed in copending application 102,762 attention is invited to the fact that in the present instance the regulating wheel slide extends the full depth of the bed from front to rear and that the control mechanism is offset as respects the regulating wheel unit itself.

The rear portion of the slide 16 is formed with longitudinal ways 40' for the supplemental slide 41. This slide in turn is provided with ways 42 at right angles to the ways 40 slidably supporting the internal grinder slide 43. This slide has the bearings 44 for the internal grinder spindle 45 bearing the elongated small diameter internal grinding wheel 46. It also supports the high speed motor 47 directly connected as by belt 48 with pulley 49 on shaft 45 so that the internal grinding wheel may be satisfactorily operated at a proper grinding rate of speed. Also this shaft is rotated in a counter clockwise direction so that the engagement of its operative face with the inner surface of the work piece is in the direction of the movement of the work piece surface as determined by the exterior engagement of the grinding wheel and regulating wheel therewith.

In order that proper grinding may be performed both on the exterior and on the interior of the work piece it is necessary that there be a relative movement between the exterior grinding wheel and the work position determining regulating wheel and also a relative movement between the internal grinding wheel and the work position determining regulating wheel so that the final wall may be of proper thickness as well as the inner and outer surfaces concentrically generated. This relative movement between grinding and regulating wheel is preferably effected by a cam mechanism imparting an in and out movement to the regulating wheel. That this movement may not of itself effect the relative positions of the internal grinder and the regulating wheel the internal grinder slide is mounted upon the regulating wheel slide and consequently is movable therewith. To operatively relate the work and internal grinder under these conditons, it is necessary that the internal grinder be shifted with respect to the regulating wheel.

Power to automatically impart the necessary movement to the internal grinding wheel slide mechanism in timed relation to the movement of the regulating wheel is supplied through the bevel pinion 32 on shaft 30. This pinion meshes with a second pinion 50 on the telescoping shaft 51 which bears on its forward end the bevel or mitre gear 52 meshing with gear 53 on shaft 54. Shaft 54 also bears cam 55 having a properly shaped track 56 to receive the cam pin 57 on rock lever 58. This lever is pivoted as to 59 to lugs 60 on regulating wheel slide 16 and is coupled by the linkage 61 with slide block 62. This slide block has swiveled therein the shank of adjusting screw 63 longitudinally slidable in guide bearing 64 and having its forward end engaged in the threaded socket 65 of slide 41. The structure here shown is generally similar to that described for shifting of the slide 16 and it will be noted the two cam control mechanisms for the two slides receive power from motor 27 through fixed gear trains so that their operation is properly synchronized. The cam tracks of the two control cams 33 and 56 may be related to give any desired relative movements to the slides and are ordinarily related and timed to cause the several relative movements hereinafter described in connection with the appended summary of manner of operation of the machine.

It will be understood in in-feed grinding whether of the external or internal type it is preferable that there be a relative reciprocating movement between work and the grinding wheel to prevent formation of scratches, grooves or the like and insure even distribution of wear on the grinding wheel and consequent uniformity in the finished product. A convenient mechanism for attainment of this result is illustrated in connection with Figure 5 of the drawings a. By reference to Figure 2, it will be noted that both the external and internal grinding wheel spindles are provided with corresponding or duplicate mechanisms of this nature, the same being hereinafter specifically described in its application to the internal grinder spindle 45. The spindle to be reciprocated, here indicated as 45, has keyed thereon a gear 66 coupled with loose gear 67 through a double differential tooth gear 68 causing slow rotation of gear 67 as respects shaft 45. This gear is normally held against longitudinal movement between the abutment rib 68′ on the spindle housing 69 and the releasable lock washer 70 moved into and out of clamping position by control handle 71.

The hub of gear 67 bears a pin or roller 72 riding in the cam slot 73 of the enclosed hub 74 of gear 66. This latter is prevented from longitudinal movement on the grinder spindle 49 by engagement at one end with a shoulder on the spindle and at the opposite end by the thrust bearing 75.

In operation, as spindle 49 rotates, gear 66 will drive gear 68 and on account of the tooth differential will cause rotation of gear 67 at a slightly different rate. If handle 71 is in locking position, as illustrated in Figure 5 gear 67 will be held against axial movement. Consequently pin 72 will gradually travel circumferentially in groove 73 causing a relative sliding movement of spindle 45 and its wheel so that the wheel has a back and forth reciprocation during grinding. When it is desired to eliminate this reciprocation as is particular the case in truing, handle 71 is swung to the right releasing clamp washer 70. The parts continue to rotate, but gear 67 then slides back and forth on hub 74 under influence of the cam without shifting the spindle. If desired, use may be made of the lock nut structure 76 engageable with the thrust bearing 75 to positively secure the spindle against endwise movement.

Truing of the internal grinding wheel may be effected as by a suitable truing device 77 carried by the regulating wheel housing and adjustable through handle 78. When this operation is being performed slide 43 is given a back and forth movement on its guide 42 as by screw 78′ and hand wheel 79.

The general cyclic operation of the machine in the production of a completed work piece will be best understood by reference to Figures 7, 8, and 9. For introduction of the work into the machine the regulating wheel 22 is retracted from the grinding wheel "C" and the internal grinding wheel 46 while retracted with the regulating wheel as respects the grinding wheel is also retracted from the regulating wheel by action of its control cam so as to be disposed substantially central or axial of the bushing or like work piece 80 to be ground. This position of the parts is illustrated in Figure 7.

Inasmuch as the work piece must necessarily be of predetermined outside diameter and it is essential that the internal surface be concentric with said outside diameter giving a uniform wall thickness, the grinding is preferably first substantially completed as respects said outer surface. This is effected by narrowing the grinding throat, as by shifting the main regulating wheel slide in the direction of the grinding wheel. This brings the work into proper engagement with grinding wheel "C" as shown in Figure 8 while the cam groove 56 has a concentric portion at this point so there is no variation in the relative spacing of the internal grinding wheel 46 and the regulating wheel 22, the internal grinding wheel remaining inactive until the major stock removal on the exterior of the work piece 80 has been completed. At this point cam groove 56 becomes operative to shift the internal grinding wheel 46 into engagement with the inner wall of the work in opposition to the regulating wheel 22 when this wheel will become operative to properly grind the wall of the rotating work piece to a uniform thickness as determined by the ultimate separation between proximate portions of the wheels 46 and 22.

It will thus be seen that since the work piece has first been externally ground to substantially correct diameter and cylindrical in form, that this outer cylindrical surface as positioned by the regulating wheel now determines the position of the work with respect to the internal grinding wheel and as the distance between wheel 22 and 46 is established the piece will be properly concentrically ground with a single handling operation and without the necessity of chucking or otherwise positively mounting the work piece for performance of the internal grinding operation.

The grinding having been completed, the wheels then shift from the position shown in Figure 9 back to initial starting position as indicated in Figure 7 when the completed work piece may be removed and a new one inserted.

To facilitate removal of a finished work piece use may be made of the ejector 24 urged into ejecting position by spring 81. The ejector has a lug 82 inter-engaged with teeth 83 of the control ratchet 84 carried by rod 85 journaled in bearings 86 on the work rest bracket 17. On the forward end of rod 85 is a ratchet 87 engaged by pawl 88 of gear 89 meshing with rack 90 on bed "A." It will be noted the teeth 83 have flattened table portions 84' normally receiving lug 82 and holding the ejector in retracted position. As the regulating wheel slide moves outwardly gear 89 through its engagement with the stationary rack 90 will be rotated. This rotation is transferred through the pawl and ratchet mechanism to rod 85 so that as the grinding throat is opened, lug 82 will snap off its supporting tooth and allow spring 81 to shift the ejector inward. Continued rotation will cause the adjacent tooth 83 to return the ejector to its outward position, permitting of insertion of a new work piece. On return or inward movement of the regulating wheel slide gear 89 will be reversely rotated, the pawl 88 returning idly over ratchet 87 so that the ejector remains in its retracted position until the throat is again opened.

In order that the work may be properly steadied when first introduced into the grinding throat and subsequently satisfactorily held in place, use may be made of an upper work engaging roller 90' shown as carried by arm 91 pivoted to the housing "B" of the grinding wheel. Said arm is actuated by spring 92 to cause roller 90 to exert suitable retaining pressure against the work, urging it in the direction of the regulating wheel and work support and holding it away from both of the grinding wheels.

From the foregoing description the improved process of producing tubular articles such as bushings or the like should be readily understood and it will be seen that by this process the articles are simultaneously ground on both inner and outer surfaces while floating between members performing a grinding operation thereon and means for controlling the rotation of the work piece.

Further, the structure of the machine here illustrated capable of automatically performing the several steps of the process in question should be readily appreciated. It will be seen there has been provided an improved machine having means for floatingly supporting a work piece and for urging the exterior of the work piece against a grinding member which will reduce it to predetermined outside diameter and in addition having supplemental means for properly increasing the internal diameter while producing an ultimate uniform peripheral wall thickness.

I claim.

1. A centerless grinding machine including a pair of spaced grinding wheels operated at a high or grinding rate of speed and a work rest for peripherally engaging and supporting a work piece for engagement by the grinding wheels, and a regulating wheel operating at a slow work controlling rate of speed adjacent the work rest and adapted to cooperate with the work rest in supporting a work piece for action of the grinding wheels thereon.

2. A grinding machine including opposed grinding and regulating wheels and an intermediate work rest, a supplemental grinding wheel intermediate the two first named wheels, means for relatively moving the two first named wheels to cause operative engagement of a work piece thereby, and additional means for moving the third wheel into engagement with the work piece while positioned by the two first named wheels.

3. A machine of the character described, including a grinding wheel for peripheral engagement with a work piece, an adjacent grinding wheel for internal engagement with the work piece, a regulating wheel and a work rest for peripheral engagement with the work piece to support the same in position for grinding, and means for relatively shifting the work and grinding wheels into operative relation.

4. A machine of the character described, including a large diameter grinding wheel for peripheral engagement with a work piece, an adjacent small diameter grinding wheel for internal engagement with the work piece, a regulating wheel and a work rest for peripheral engagement with the work piece to support the same in position for grinding, and automatic means for relatively shifting the work and grinding wheels into operative relation.

5. A centerless grinding machine including a bed or support, a grinding wheel carried thereby for exterior operation on a work piece, a slide carried by the bed, a regulating wheel mounted on the slide for exterior engagement with a work piece and movable with the slide toward and from the grinding wheel, and a second grinding wheel for engagement with the work piece carried by the regulating wheel slide and movable with said slide and relative thereto, substantially as and for the purpose described.

6. A centerless grinding machine including a bed or support, a grinding wheel carried thereby for exterior operation on a work piece, a slide carried by the bed, a regulating wheel mounted on the slide for exterior engagement with a work piece and movable with the slide toward and from the grinding wheel, and a second grinding wheel for engagement with the work piece carried by the regulating wheel slide and movable with said slide and relative thereto, independent actuators for imparting shifting movement to the regulating wheel and to said second grinding wheel, and means coupling said actuators for synchronous operation.

7. A grinding machine of the character described, including a grinding wheel, an opposed regulating wheel, means for relatively shifting said parts to operatively engage a work piece therebetween, a supplemental grinding wheel, means for shifting said supplemental grinding wheel relative the other two wheels, and timing mechanism for automatically operatively relating said second grinding wheel to the work subsequent to the initial engagement of the first grinding wheel therewith.

8. A grinding machine of the character described, including a grinding wheel, an opposed regulating wheel, means for relatively shifting said parts to operatively engage a work piece therebetween, a supplemental wheel, means for shifting said supplemental grinding wheel relative the other two wheels, timing mechanism for automatically operatively relating said second grinding wheel to the work subsequent to the initial engagement of the first grinding wheel therewith, means for adjusting the initial position of the regulating and main grinding wheels relative to each other, and additional means for adjusting the relative position of the second grinding wheel and the regulating wheel.

9. A grinding machine of the character herein described including a pair of grinding wheels for engagement with a work piece, a work rest for peripheral engagement with the work piece to support the same, a regulating wheel adjacent the parts for peripheral engagement with the work piece to control the rate of rotation thereof when on the rest, and means for imparting oscillatory movement to one of the wheels as respects the work piece.

10. A grinder of the character described including a main grinding wheel, a work rest adjacent the grinding wheel for rotatably supporting a work piece, a regulating wheel adjacent the work rest for controlling the rate of rotation of a piece on the rest, a supplemental grinding wheel, means for jointly adjusting the position of the regulating wheel and supplemental grinding wheel with respect to the main grinding wheel, and additional means for independently relatively adjusting the position of said two members with respect to each other.

11. A machine for the production of tubular articles including a bed or support, a work rest carried thereby, a large diameter grinding wheel supported thereon at one side of the rest, a smaller internal grinding wheel supported by the bed at the opposite side of the rest, said grinding wheels being operable at a high grinding rate of surface speed, and a regulating wheel on the opposite side of the rest from the large diameter grinding wheel in position to peripherally engage a work piece on the rest and support same in engagement with the grinding wheels, and means for operating the regulating wheel at a slow rate of surface speed to control the rate of rotation of a work piece in engagement therewith.

12. A machine for the production of tubular articles including a bed or support, a work rest carried thereby, a large diameter grinding wheel supported thereon at one side of the rest, a smaller internal grinding wheel supported by the bed at the opposite side of the rest, said grinding wheels being operable at a high grinding rate of surface speed, and a regulating wheel on the opposite side of the rest from the large diameter grinding wheel in position to peripherally engage a work piece on the rest and support same in engagement with the grinding wheels, means for operating the regulating wheel at a slow rate of surface speed to control the rate of rotation of a work piece in engagement therewith, means for imparting an axial, reciprocating movement to the large diameter grinding wheel to traverse the exterior face of the work piece, and an independent means for axially reciprocating the internal grinding wheel to cause same to independently traverse the inner face of the work.

13. A machine for the production of tubular articles including a bed or support, a work rest carried thereby, a large diameter grinding wheel supported thereon at one side of the rest, a smaller internal grinding wheel supported by the bed at the opposite side of the rest, said grinding wheels being operable at a high grinding rate of surface speed, and a regulating wheel on the opposite side of the rest from the large diameter grinding wheel in position to peripherally engage a work piece on the rest and support same in engagement with the grinding wheels, means for operating the regulating wheel at a slow rate of surface speed to control the rate of rotation of a work piece in engagement therewith, means for imparting an axial reciprocating movement to the large diameter grinding wheel to traverse the exterior face of the work piece, an independent means for axially reciprocating the internal grinding wheel to cause same to independently traverse inner face of the work, and means for restraining axial movement of the work piece during grinding.

14. A machine for the production of tubular articles including a bed or support, a work rest carried thereby, a large diameter grinding wheel supported thereon at one side of the rest, a smaller internal grinding wheel supported by the bed at the opposite side of the rest, said grinding wheels being operable at a high grinding rate of surface speed, and a regulating wheel on the opposite side of the rest from the large diameter grinding wheel in position to peripherally engage a work piece on the rest and support same in engagement with the grinding wheels, means for operating the regulating wheel at a slow rate of surface speed to control the rate of rotation of a work piece in engagement therewith, means for imparting an axial reciprocating movement to the large diameter grinding wheel to traverse the exterior face of the work piece, an independent means for axially reciprocating the internal grinding wheel and cause same to independently traverse the inner face of the work, and means for restraining axial movement of the work piece during grinding, means for causing a relative movement between the grinding and regulating wheels to operatively engage and disengage a work piece therebetween, and means for ejecting a work piece from position within the grinding throat when the grinding wheels are operatively disassociated therefrom.

15. A machine for the formation of inner and outer surfaces of a tubular article including a work rest for engagement with one of the said surfaces, a regulating wheel operable at a slow rate of speed for peripheral engagement with the work piece when on the work rest to control the rate of rotation thereof, a grinding wheel in opposition to said regulating wheel for operative engagement with the exterior of the work piece, means for varying the relative separation of said parts to control the outside diameter of a work piece being operated upon thereby, an internal grinding wheel projectable into a position between the exterior grinding wheel and the regulating wheel, and means for varying the distance between said internal grinding wheel and the regulating wheel to control the thickness of wall of the finished work piece.

16. A machine of the character described, including a bed or support, a large diameter external grinding wheel carried thereby, a slide mounted on the bed for movement toward and from the grinding wheel, a regulating wheel carried by the slide and rotatable at a slow work controlling rate of speed, a work rest member projecting intermediate the grinding and regulating wheels for supporting a piece of work in position therebetween, an internal grinding wheel projecting above the work rest into the throat between the grinding wheel and regulating wheel, means for axially reciprocating the internal grinding wheel to cause a transversing of the work by said wheel, and additional means for imparting a relative feeding movement to the internal grinding wheel as respects the two first named wheels to operatively associate the internal wheel with the interior of a work piece when in position on the work rest between the exernal grinding wheel and the regulating wheel.

17. A machine for the automatic production of ground tubular articles including an external and an internal grinding wheel, a work rest and a regulating wheel, means for automatically effecting a shifting movement of the exterior grinding and regulating wheels one with respect to the other to cause the mutual engagement thereby of a work piece when in position on the work rest, additional means for automatically shifting the internal grinding wheel into operative engagement with the interior of the work piece while held between the exterior grinding and regulating wheel members, means for causing disengagement of the work by both of said grinding wheels, and means for automatically ejecting a dis-engaged work piece.

18. A grinder of the nature described including a bed or support, a large diameter external grinding wheel carried thereby, a slide in opposition to said grinding member, a regulating wheel carried by the slide and moveable in a direction toward and from the grinding wheel, a supplemental slide carried by the main slide and movable therewith and relative thereto in a direction toward and from the grinding wheel, an internal grinding wheel carried by the supplemental slide and normally projecting into the space between the regulating wheel and the external grinding wheel, and means for retracting the internal grinding wheel on its supplemental slide to move same out of the throat between the main grinding wheel and the regulating wheel.

19. A grinder of the nature described including a bed or support, a large diameter external grinding wheel carried thereby, a slide in opposition to said grinding member, a regulating wheel carried by the slide and movable in a direction toward and from the grinding wheel, a supplemental slide carried by the main slide and movable therewith and relative thereto in a direction toward and from the grinding wheel, an internal grinding wheel carried by the supplemental slide and normally projecting into the space between the regulating wheel and the external grinding wheel, means for retracting the internal grinding wheel on its supplemental slide to move same out of the throat between the main grinding wheel and the regulating wheel, and means for automatically imparting a limited reciprocating movement to the internal grinding wheel independent of the axial retraction thereof.

20. A machine of the character described including a bed, a grinding wheel carried thereby for exterior engagement with the work piece, a main slide carried by the bed and movable toward and from the grinding wheel, a regulating wheel unit carried by said slide including a regulating wheel disposed in peripheral opposition to the grinding wheel, an internal grinding wheel carried by the slide in advance of the regulating wheel for internal engagement with a work piece, means for automatically shifting the slide to move the internal grinding wheel and regulating wheel in a direction toward and from the first mentioned grinding wheel, power means for imparting a reciprocating movement of definite amplitude to the internal grinding wheel as respects the regulating wheel and in timed relation to the movement of said regulating wheel, and additional means for initially adjusting the relative positions of the regulating wheel and internal grinding wheel to vary the effective relationship of relative reciprocations of said parts of a pre-determined amplitude.

21. A machine for the production of ground tubular articles including a grinding wheel rotatable at a high grinding rate of speed and an opposed regulating wheel rotatable at a slow work controlling rate of speed, said wheels forming a throat therebetween for reception, grinding and rotation of a work piece, a work engaging rest disposed intermediate the wheels and subtending the throat for support of a work piece during engagement of the wheels thereby, a supplemental work abrading member projecting into the throat between the wheels in spaced relation to the work rest for interior engagement with the work piece, and means for rotating said supplemental member for interior grinding of the work piece.

22. A machine for the production of ground tubular articles including a grinding wheel rotatable at a high grinding rate of speed and an opposed regulating wheel rotatable at a slow work controlling rate of speed, said wheels forming a throat therebetween for reception, grinding and rotation of a work piece, a work engaging rest disposed intermediate the wheels and subtending the throat for support of a work piece during engagement of the wheels thereby, a supplemental work abrading member projecting into the throat between the wheels in spaced relation to the work rest for interior engagement with the work piece, means for rotating said supplemental member for interior grinding of the work piece, said supplemental member being of less diameter than the internal diameter of the work piece to be engaged thereby, and means for urging the supplemental member and the regulating wheel one toward the other to effect proper engagement of the work piece therebetween.

23. In a machine of the character described the combination with a support member, of a work rest rising therefrom, a regulating wheel member rotatably supported adjacent the work rest, means for rotating said regulating member at a slow work controlling rate of speed for frictional engagement with a work piece on the rest to control the rate of rotation thereof, an internal grinding wheel supported adjacent the parts and having an operative portion disposed in overlying relation to the work rest for interior engagement with a work piece supported thereon, means for rotating said member at a high grinding rate of speed, and additional means for automatically moving said grinding member transversely of its axis in a direction toward and from the regulating wheel to operatively associate and disassociate the grinding member with the work piece.

24. In a machine of the character described the combination with a support member, of a work rest rising therefrom, a regulating wheel member rotatably supported adjacent the work rest, means for rotating said regulating member at a slow work controlling rate of speed for frictional engagement with a work piece on the rest to control the rate of rotation thereof, an internal grinding wheel supported adjacent the parts and having an operative portion disposed in overlying relation to the work rest for interior engagement with a work piece supported thereon, means for rotating said member at a high grinding rate of speed, additional means for automatically moving said grinding member transversely of its axis in a direction toward and from the regulating wheel to operatively associate and disassociate the grinding member with the work piece, and additional means for imparting an axial reciprocating movement to the grinding member for traverse of the work piece.

25. In a machine of the character described the combination with a support member, of a work rest rising therefrom, a regulating wheel member rotatably supported adjacent the work rest, means for rotating said regulating member at a slow work controlling rate of speed for frictional engagement with a work piece on the rest to control the rate of rotation thereof, an internal grinding wheel supported adjacent the parts and having an operative portion disposed in overlying relation to the work rest for interior engagement with a work piece supported thereon, means for rotating said member at a high grinding rate of speed, additional means for automatically moving said grinding member transversely of its axis in a direction toward and from the regulating wheel to operatively associate and disassociate the grinding member with the work piece, additional means for imparting an axial reciprocating movement to the grinding member for traverse of the work piece, and means for restraining axial movement of the work piece on the rest, the regulating wheel having its axis disposed in angular relation to the axis of rotation of the grinding member whereby when rotated said wheel will exert a thrust component maintaining the work piece in engagement with said restraining means.

26. A machine of the nature described including a bed, a grinding wheel carried by the bed and rotatable at a high grinding rate of speed, a supporting slide mounted on the bed for movement in a direction toward and from the grinding wheel, a work supporting rest rising from the slide, a regulating wheel unit carried by the slide in opposition to the work rest for co-operative engagement therewith for support and control of a work piece during the performance of grinding operations thereon, a supplemental slide supported by the main slide for movement therewith and relative thereto, an internal grinding member carried by the supplemental slide and having a portion projecting in overlying relation to the work rest for interior engagement with a work piece when mounted on the rest, means for movement of the parts as a unit in the direction of the grinding wheel for performance of an external grinding operation on the work, and additional means for shifting the internal grinding member in the direction of the regulating wheel for engagement of a work piece between said wheels to effect an internal grinding thereof.

27. A machine of the nature described including a bed, a grinding wheel carried by the bed and rotatable at a high grinding rate of speed, a supporting slide mounted on the bed for movement in a direction toward and from the grinding wheel, a work supporting rest rising from the slide, a regulating wheel unit carried by the slide in opposition to the work rest for co-operative engagement therewith for support and control of a work piece during the performance of grinding operations thereon, a supplemental slide supported by the main slide for movement therewith and relative thereto, an internal grinding member carried by the supplemental slide and having a portion projecting in overlying relation to the work rest for interior engagement with a work piece when mounted on the rest, means for movement of the parts as a unit in the direction of the grinding wheel for performance of an external grinding operation on the work, additional means for shifting the internal grinding member in the direction of the regulating wheel for engagement of a work piece between said wheels to effect an internal grinding thereof and means for adjusting said main and supplemental slides with respect to their respective shifting mechanisms to vary their limits of movement with respect to the bed for reciprocations thereof of a given amplitude.

28. A machine of the nature described including a bed, a grinding wheel carried by the bed and rotatable at a high grinding rate of speed, a supporting slide mounted on the bed for movement in a direction toward and from the grinding wheel, a work supporting rests rising from the slide, a regulating wheel unit carried by the slide in opposition to the work rest for co-operative engagement therewith for support and control of a work piece during the performance of grinding operations thereon, a supplemental slide supported by the main slide for movement therewith and relative thereto, an internal grinding member carried by the supplemental slide and having a portion projecting in overlying relation to the work rest for interior engagement with a work piece when mounted on the rest, means for movement of the parts as a unit in the direction of the grinding wheel for performance of an external grinding operation on the work, additional means for shifting the internal grinding member in the direction of the regulating wheel for engagement of a work piece between said wheels to effect an internal grinding thereof, means for adjusting said main and supplemental slides with respect to their respective shifting mechanisms to vary their limits of movement with respect to the bed for reciprocation thereof of a given amplitude, and additional means for imparting an axial reciprocation to the internal grinding member.

29. A machine of the nature described including a bed, a grinding wheel carried by the bed and rotatable at a high grinding rate of speed, a supporting slide mounted on the bed for movement in a direction toward and from the grinding wheel, a work supporting rest rising from the slide, a regulating wheel unit carried by the slide in opposition to the work rest for cooperative engagement therewith for support and control of a work piece during the performance of grinding operations thereon, a supplemental slide supported by the main slide for movement therewith and relative thereto, an internal grinding member carried by the supplemental slide and having a portion projecting in overlying relation to the work rest for interior engagement with a work piece when mounted on the rest, means for movement of the parts as a unit in the direction of the grinding wheel for performance of an external grinding operation on the work, additional means for shifting the internal grinding member in the direction of the regulating wheel for engagement of a work piece between said wheels to effect an internal grinding thereof, means for adjusting said main and supplemental slides with respect to their respective shifting mechanisms to vary their limits of movement with respect to the bed for reciprocations thereof of a given amplitude, and means for effecting a definite adjustment of the internal grinding member in an axial direction.

30. In a machine of the nature described including a bed, an external grinding wheel rotatably supported thereby, a main motor for effecting rotation of said grinding wheel at a high grinding rate of speed, a slide supported by the bed in opposition to the grinding wheel, a work positioning mechanism carried by the slide including a work support and an opposed regulating wheel, a motor means for imparting rotation to said regulating wheel at a slow work controlling rate of speed, a second slide mounted on the first for movement therewith and relative thereto, an internal grinding unit carried by said slide including an abrading wheel and independent modified means for effecting high speed rotation thereof, automatic means for effecting movement of the first slide with respect to the bed and the second slide with respect to the first, and a common source of power for actuating both of said slide adjusting mechanisms.

31. In a machine of the nature described including a bed, an external grinding wheel rotatably supported thereby, a main motor for effecting rotation of said grinding wheel at a high grinding rate of speed, a slide supported by the bed in opposition to the grinding wheel, a work positioning mechanism carried by the slide including a work support and an opposed regulating wheel, a motor means for imparting rotation to said regulating wheel at a slow work controlling rate of speed, a second slide mounted on the first for movement therewith and relative thereto, an internal grinding unit carried by said slide including an abrading wheel and independent means for effecting high speed rotation thereof, automatic means for effecting movement of the first slide with respect to the bed and the second slide with respect to the first, a common source of power for actuating both of said slide adjusting mechanisms, and means for manually adjusting one of said slides with respect to the automatic shifting mechanism therefor.

32. In a machine of the nature described including a bed, an external grinding wheel rotatably supported thereby, a main motor for effecting rotation of said grinding wheel at a high grinding rate of speed, a slide supported by the bed in opposition to the grinding wheel, a work positioning mechanism carried by the slide including a work support and an opposed regulating wheel, a motor means for imparting rotation to said regulating wheel at a slow work controlling rate of speed, a second slide mounted on the first for movement therewith and relative thereto, an internal grinding unit carried by said slide including an abrading wheel and independent means for effecting high speed rotation thereof, automatic means for effecting movement of the first slide with respect to the bed and the second slide with respect to the first, a common source of power for actuating both of said slide adjusting mechanisms, and means for individually manually adjusting each of said slides with respect to the automatic shifting mechanism therefor.

33. In a machine of the nature described including a bed, an external grinding wheel rotatably supported thereby, a main motor for effecting rotation of said grinding wheel at a high grinding rate of speed, a slide supported by the bed in opposition to the grinding wheel, a work positioning mechanism carried by the slide including a work support and an opposed regulating wheel, a motor means for imparting rotation to said regulating wheel at a slow work controlling rate of speed, a second slide mounted on the first for movement therewith and relative thereto, an internal grinding unit carried by said slide including an abrading wheel and independent means for effecting high speed rotation thereof, automatic means for effecting movement of the first slide with respect to the bed and the second slide with respect to the first, a common source of power for actuating both of said slide adjusting mechanisms, and means for automatically effecting a limited axial reciprocation of the internal grinding member with respect to the supplemental slide.

34. In a machine of the nature described including a bed, an external grinding wheel rotatably supported thereby, a main motor for effecting rotation of said grinding wheel at a high grinding rate of speed, a slide supported by the bed in opposition to the grinding wheel, a work positioning mechanism carried by the slide including a work support and an opposed regulating wheel, a motor means for imparting rotation to said regulating wheel at a slow work controlling rate of speed, a second slide mounted on the first for movement therewith and relative thereto, an internal grinding unit carried by said slide, including an abrading wheel and independent means for effecting high speed rotation thereof, automatic means for effecting movement of the first slide with respect to the bed and the second slide with respect to the first, a common source of power for actuating both of said slide adjusting mechanisms, means for automatically effecting a limited axial reciprocation of the internal grinding member with respect to the supplemental slide, and additional means for effecting a bodily axial adjusting movement of said internal grinding member.

35. A machine of the character described including a bed or support, a slide mounted thereon for movement relative thereto, a work rest mounted on the slide, a regulating wheel disposed on the slide in proximity to the rest for cooperation therewith in support of a work piece, a combined stop and ejector member mounted on the slide adjacent the rest, means for imparting a reciprocating movement to the slide, and means operated by the slide when moved in one direction for imparting successive ejecting and retracting movements to the ejector substantially as and for the purposes described.

36. A machine of the character described including a bed or support, a grinding wheel operable at a high grinding rate of speed and an opposed regulating wheel operable at a slow work controlling rate of speed, a work rest for cooperation with the regulating wheel in supporting a work piece, said two wheels being mounted for individual sliding adjustment as respects the bed, individual means for imparting rotation to said wheels respectively at a work controlling and a work grinding speed, individual shifting mechanisms for effecting movements of the wheels with respect to the bed, and a common source of power for actuation of said individual wheel shifting mechanisms.

37. A machine of the character described including a bed or support, a grinding wheel operable at a high grinding rate of speed and an opposed regulating wheel operable at a slow work controlling rate of speed, a work rest for cooperation with the regulating wheel in supporting a work piece, said two wheels being mounted for individual sliding adjustment as respects the bed, individual means for imparting rotation to said wheels respectively at a work controlling and a work grinding speed, individual shifting mechanisms for effecting movements of the wheels with respect to the bed, a common source of power for actuation of said individual wheel shifting mechanisms, and manual means for effecting an adjustment of one of said wheel mechanisms in a direction transverse to the automatic adjustment thereof.

38. A machine of the character described including a bed or support, grinding and regulating wheels and a work rest carried thereby for cooperative engagement with a work piece to rotate and abrade the same, means for effecting a back and forth movement of certain of the parts with respect to the bed or support, ejector mechanism associated with the work rest for discharging a work piece therefrom, and cooperating means carried by the ejector and movable member for effecting an ejecting and retracting movement of the ejector during a unidirectional shifting of the movable member.

39. A grinding machine comprising a bed, a work support on the bed, means restricting axial movement of the work on the support during grinding, a wheel head supported by the bed, a spindle journaled in the head, a grinding wheel supported by the spindle, means for shifting the head and supported parts as a unit relative to the bed in the direction of the longitudinal axis of the spindle, and means for additionally axially shifting the spindle and grinding wheel independently of the head.

In testimony whereof I affix my signature.

SOL EINSTEIN.